United States Patent [19]

Boone et al.

[11] 4,311,612
[45] Jan. 19, 1982

[54] OLEFIN POLYMERIZATION CATALYST

[75] Inventors: David E. Boone, Chicago; James L. Jezl, St. Charles, both of Ill.

[73] Assignee: Standard Oil Company (Indiana), Chicago, Ill.

[21] Appl. No.: 180,973

[22] Filed: Aug. 25, 1980

[51] Int. Cl.$^3$ .............................. C08F 4/64; C08F 4/68
[52] U.S. Cl. .............................. 252/429 B; 252/429 C; 252/431 C
[58] Field of Search ............ 252/429 B, 429 C, 431 C

[56] References Cited

U.S. PATENT DOCUMENTS

| | | | |
|---|---|---|---|
| 3,642,746 | 2/1972 | Kashiwa et al. | 252/429 B X |
| 3,644,318 | 2/1972 | Diedrich et al. | 252/429 C X |
| 3,647,772 | 3/1972 | Kashiwa | 252/429 B X |
| 3,658,722 | 4/1972 | Delbouille et al. | 252/429 C |
| 3,694,421 | 9/1972 | Vetter | 252/429 C X |
| 3,875,075 | 4/1975 | Boone et al. | 252/429C |
| 3,901,863 | 8/1975 | Berger et al. | 252/429 C X |
| 3,984,389 | 10/1976 | Delbouille et al. | 252/429 C X |
| 3,989,881 | 11/1976 | Yamaguchi et al. | 252/429 B X |
| 4,115,319 | 9/1978 | Scata et al. | 252/431 C X |
| 4,124,532 | 11/1978 | Giannini et al. | 252/429 B |
| 4,130,699 | 12/1978 | Hoff et al. | 526/67 |

FOREIGN PATENT DOCUMENTS 1321766 6/1973 United Kingdom .
2035338A 6/1980 United Kingdom .

OTHER PUBLICATIONS

Japanese Patent Public Disclosure 34090/1971.

Primary Examiner—Patrick Garvin
Attorney, Agent, or Firm—Stephen L. Hensley; William T. McClain; William H. Magidson

[57] ABSTRACT

High activity catalyst component for olefin polymerization comprises reaction product of Group IVB-VB metal-containing component with product prepared by reaction of components comprising magnesium alcoholate and halocarboxylic acid, provided that when such components contain less than an effective amount of halogen, reaction product is reacted with halogenating agent. Magnesium alcoholate-halocarboxylic acid reaction product can be obtained in hydrocarbon-soluble or -insoluble form such that catalyst component preparation involves a liquid-liquid or liquid-solid system as desired. Catalysts comprising the above-described component and organometallic promoter are sufficiently active to eliminate need for removal of catalyst residues from polyolefins produced in the presence thereof.

10 Claims, No Drawings

OLEFIN POLYMERIZATION CATALYST

BACKGROUND OF THE INVENTION

This invention relates to the polymerization of olefins, and more particularly, to improved, highly active catalysts and catalyst components therefor.

It is well known to polymerize olefins using catalysts generally comprising an organometallic activator and a supported, transition metal-containing component; and such catalysts often exhibit highly desirable performance in the polymerization of olefins in that the same are sufficiently active that commercially useful products can be obtained without the need for separation of catalyst residues from the polymeric product. Typically, the supported component of such catalysts is prepared by reaction of a liquid, transition metal-containing component with a solid support material, such as a metal oxide or salt, to form a solid catalyst component which is activated with an organometallic activator such as an aluminum alkyl or alkylaluminum halide. For example, U.S. Pat. No. 3,644,318 (Diedrich et al.) discloses highly active catalysts comprising an organoaluminum activator and a supported component prepared by reaction of solid magnesium alcoholate with liquid, halogen-containing compounds of titanium (IV), optionally followed by reaction of the result with an organoaluminum component. U.S. Pat. No. 3,901,863 (Berger et al.) discloses highly active catalysts wherein the supported component is prepared by reaction of liquid, oxygenated organic transition metal-containing component, such as a tetraalkyl titanate, with a solid, oxygenated organic divalent metal compound and alkylaluminum halide.

While such catalysts often exhibit desirably high activities, polymerization performance typically is not satisfactory in all respects because numerous polymer properties are affected by the choice of catalysts. For example, polyolefin processability can vary substantially depending upon polymer molecular weight and molecular weight distribution, both of which are influenced by the choice of catalyst. Polymer particle size and bulk density also vary depending upon the choice of catalyst. In terms of process efficiency, highly active catalysts such as those described hereinabove give important advantages in terms of eliminating the need for removal of catalyst residues; however, process efficiency can suffer in other respects. For example, preparation of the above described supported catalyst components is disadvantageous because both solid and liquid phases are present during preparation. In order to ensure adequate reaction between the solid and liquid reactants it often is necessary to employ a substantial excess of the liquid reactant as well as vigorous agitation and/or high temperatures in preparation.

Efforts to avoid the above-described difficulties while maintaining desirable polymerization performance in other respects have met with varying degrees of success. U.S. Pat. No. 3,989,881 (Yamaguchi et al.) discloses supported catalyst components of the formula

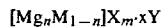

wherein M is titanium or vanadium, X is halogen, Y is ether, $0.01 \leq n \leq 0.99$, $2 < m < 4$ and $1 < x < 3$, which are prepared by reaction of (1) an ether solution of a titanium or vanadium halide-ether complex with (2) an ether solution of a magnesium halide-ether complex. The disclosed supported catalyst components can be combined with organoaluminum component to form a catalyst having sufficiently high activity that elimination of catalyst residues is unnecessary; however, polyolefin molecular weight distributions are narrow according to the patentee and, although the disclosed preparative method avoids problems associated with contacting solid and liquid phases, the preparation is disadvantageous in that extra steps are required for preparation of the titanium or vanadium halide- and magnesium halide-ether complexes. Further, preparation of such catalyst components is costly due to the use of electron donors as solvents.

U.S. Pat. No. 4,124,532 (Giannini et al.) discloses supported catalyst components of the formula

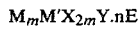

wherein M is magnesium, manganese and/or calcium, m ranges from 0.5 to 2, M' is titanium, vanadium and/or zirconium, X is chlorine, bromine or iodine, Y is halogen, oxygen or specified oxygen-, nitrogen- or sulfur-containing organic groups, n ranges from 0.5 m to 20 m and E is a selected electron donor. Such catalyst components are prepared by mixing electron donor solutions of $MX_2$ and M'Y to form a liquid reaction product followed by evaporation of the electron donor solvent to recover a solid catalyst component. Similar to the supported catalyst components of Yamaguchi et al., those of Giannini et al. offer advantages in terms of avoiding a two phase preparation system; however, the use of electron donor as a solvent and the fact that an evaporation step is necessary to recover a solid reaction product from the electron donor solvent add cost to the preparation of the supported components. Further, olefin polymerization activity of catalysts containing the disclosed supported components and an organoaluminum component is relatively low as shown in the patentee's examples.

Other proposals which may be of interest with respect to the present invention include those directed to preparation of supported catalyst components by reaction of transition metal-containing components with support materials prepared by contacting various divalent metal compounds with electron donors to modify various catalyst properties. For example, U.S. Pat. No. 3,642,746 (Kashiwa et al.) discloses supported components prepared by contacting a transition metal-containing component with a solid support material prepared by contacting divalent metal halide with electron donor. According to the patentee, contacting of the metal halide with electron donor results in improved activity in polymerization of olefins. U.S. Pat. No. 3,647,772 (Kashiwa) discloses similar supported catalyst components except that the support material is a solid obtained by contacting magnesium carbonate with electron donor. U.S. Pat. No. 3,694,421 (Vetter) discloses supported catalyst components of improved polymerization activity prepared by reaction of a halogen containing titanium (IV) compound with the solid reaction product of a hydroxyl group-containing mangesium compound, e.g., Mg hydroxide, hydroxychloride, or carboxylate, with an aldehyde. U.S. Pat. No. 4,115,319 (Scata et al.) discloses stereospecific supported catalyst components prepared by reaction of titanium tetrachloride with a solid support material obtained by reaction of a halogenating agent with a magnesium compound such as an alcoholate, carboxylate, a Grignard compound or a dihydrocarbylmagnesium compound, and treatment with electron donor.

Despite the foregoing proposals, there remains a need for improved, highly active olefin polymerization catalysts having a desirable balance of properties and offering flexibility from a preparative standpoint. It is an object of this invention to provide an improved supported catalyst component for olefin polymerization and catalyst based thereon. A further object of this invention is to provide olefin polymerization catalysts which exhibit sufficiently high activites that commercially useful polymeric products can be obtained without removal of catalyst residues therefrom. A further object of the invention is to provide olefin polymerization catalysts which are sensitive to hydrogen such that a single catalyst can be used to prepare a wide variety of product grades. A further object of the invention is to provide a support catalyst component which offers advantages in terms of preparative flexibility in that either a solid-liquid or liquid-liquid preparative system can be utilized.

We have found that the objects of this invention can be attained through the use of support materials prepared by reaction of components comprising at least one magnesium alcoholate and at least one halocarboxylic acid in preparation of supported, olefin polymerization catalyst components. Advantageously, such support materials can be obtained in either hydrocarbon-soluble or -insoluble form such that on combination with a liquid transition metal-containing component, either a solid-liquid or liquid-liquid preparative system is attained without the need for expensive solvents. Further, in the liquid-liquid system, the reaction product of the support material and transition metal component often is a solid which precipitates readily from the reaction mixture such that expensive recovery operations are not required. Catalysts comprising (1) the solid reaction product of components comprising the above-described support material and Group IVB and VB metal-containing component and (2) organometallic promoter exhibit sufficiently high olefin polymerization activities that removal of catalyst residues from the polymeric products is unnecessary. Further, the invented catalysts are sensitive to hydrogen so that controllable variations in polymer molecular weights, and accordingly polymer melt flow rates, are easily attained. In addition, polyolefins prepared using such catalysts exhibit molecular weight distributions well suited for molding applications.

DESCRIPTION OF THE INVENTION

Briefly, the supported catalyst components of this invention comprise the solid product obtained by reacting components comprising (A) at least one component which is (1) a compound of a Group IVB or VB metal or (2) a reaction product of (1) with at leaset one nonreducing halogenating agent; and (B) at least one component which is (1) a reaction product of components comprising at least one magnesium alcoholate and at least one halocarboxylic acid or (2) a reaction product of (1) with at least one halogenating agent; provided that when the amount of reactive halogen in (A) and (B) is less than an amount effective to give an active catalyst component, the product of (A) and (B) is reacted with at least one halogenating agent (C) in an amount such that (A), (B) and (C) provide at least an effective amount of halogen. The (B) component can be employed either in solid form or as a solution in an inert liquid solvent such that either a solid-liquid or liquid-liquid preparative system is obtained. For use in polymerization of olefins, the invented supported component is combined with an organometallic activator to form a highly active catalyst.

In greater detail the components employed in preparation of the invented supported components include Group IVB or VB component, magnesium alcoholate-halocarboxylic acid reaction product, and optionally, halogenating agent.

Halogenating agents which are useful according to this invention are materials which contain reactive halogen and can be contacted with the Group IVB or VB component, magnesium alcoholate-halocarboxylic acid reaction product, or reaction product of such materials without adversely affecting polymerization performance of the ultimate catalyst component. Such materials are well known to the art and include organic halides such as $CCl_4$, $CBr_4$, $CHCl_3$, $CH_2CHCl$, $CCl_3CH_3$ and the like; metallic halides such as $AlCl_3$, $AlBr_3$, $BCl_3$, $SiCl_4$, $GeCl_4$, $SnCl_4$, and $SbCl_5$; non-metallic halides such as $HCl$, $HBr$, $POCl_3$, $SOCl_2$ and $NH_4Cl$; and organoaluminum halides corresponding to the formula $AlR_{3-x}X_x$ wherein each R is independently a hydrocarbyl radical, X is halogen and $0<x<3$. Mixtures of halogenating agents can be employed if desired. For purposes hereof, "metallic halides" are defined as halides of metals other than the group IVB-VIB metals. Halogenating agents that can be reacted with the Group IVB or VB component employed according to this invention without reduction of the Group IVB or VB metal are referred to herein as "nonreducing halogenating agents" and halogenting agents that are reducing agents for the Group IVB or VB metals are referred to as "reducing halogenating agents." Among the materials identified hereinabove, all but the organoaluminum halides are nonreducing.

Materials useful as the Group IVB or VB metal-containing component include compounds corresponding to the formula $(O)_pM(OR)_nX_m$ wherein M is a higher valent Group IVB or VB metal, R is a hydrocarbyl group, X is halogen, p is 0 or 1 and m and n are numbers equal to or greater than 0 such that $m+n+2p$ equals the valence of M. Mixtures of such compounds also can be used if desired. For purposes hereof, "higher valent" is defined as the +4 valence state with respect to Group IVB metals and the +3, +4 or 30 5 valence state with respect to Group VB metals. Preferably, M in the formula is titanium (IV), zirconium (IV), or vanadium (III), (IV) or (V), X is chlorine or bromine and R is a hydrocarbyl group of 1 to about 12 carbon atoms. Specific examples of useful compounds include halides and oxyhalides such as $TiCl_4$, $TiBr_4$, $ZrCL_4$, $VCl_4$ and $VOCl_3$; alcoholates and oxyalcoholates such as $Ti(OCH_3)_4$, $Ti(OC_3H_7)_4$, $Ti(OC_4H_9)_4$, $Ti(OC_6H_{13})_4$, $Ti(OC_6H_5)_4$, $Ti(OC_{12}H_{25})_4$, $Zr(OC_4H_9)_4 \cdot C_4H_9OH$, $VO(OCH_3)_2$, $V(OC_6H_{13})_4$ and $VO(OC_8H_{17})_3$; and haloalcoholates and oxyhaloalcoholates such as $Ti(OCH_3)Cl_3$, $Ti(OC_2H_5)_2Cl_2$, $Ti(OC_4H_9)_3Cl$, $VO(OC_2H_5)Cl_2$ and $VO(OC_4H_9)Cl_2$.

From the standpoint of catalytic activity, titanium compounds give best results, with titanium tetrachloride and the titanium alkoxides and alkoxychlorides containing 1 to about 6 carbon atoms per alkoxy group being preferred from the standpoint of cost and availability. Combinations of titanium compounds with zirconium and/or vanadium compounds give somewhat lower activities; however, polyolefin molecular weight distributions typically are broadened such that polymer processability improves. Preferred among the compounds of zirconium and vanadium are the chlorides, oxychlorides, alkoxides, oxyalkoxides, alkoxychlorides and oxyalkoxychlorides containing 1 to about 6 carbon atoms per alkoxy group.

If desired, the Group IVB or VB component can be a material prepared by reaction of the above-described compounds with one or more nonreducing halogenating agent. A nonreducing halogenating agent is employed in order to avoid reduction of Group IVB or VB metal to solid, lower valent metal halides which may adversely affect polymerization performance of the ultimate catalyst component and present difficulties in preparation thereof. The amount of halogenating agent to be used and conditions in the reaction thereof with the above-described Group IVB or VB compounds are not critical. However, from a practical standpoint it is preferred to employ halogenating agent in an amount such that the atomic ratio of reactive halogen in the halogenating agent to Group IVB or VB metal ranges from about 0.5:1 to about 10:1. The reaction is conveniently carried out in an inert liquid solvent for the Group IVB or VB compound at temperatures ranging from about 0° to about 200° C.

The support material employed according to this invention is the product obtained by reacting components comprising at least one magnesium alcoholate and a solubilizing amount of at least one halocarboxylic acid in an inert liquid solvent for the acid and in the substantial absence of oxygen, water, carbon oxides and other materials capable of adversely affecting polymerization performance of the ultimate catalyst component. Depending on conditions during reaction between magnesium alcoholate and halocarboxylic acid, either a hydrocarbon-soluble or -insoluble reaction product is obtained. While both types of product are suitable for use in preparation of the invented catalyst components, it is preferred to use the soluble product in order to facilitate subsequent preparative steps, and in particular, reaction support material with liquid Group IVB-VB metal component.

Useful magnesium alcoholates include those having 1 to about 20 carbon atoms per alcoholate group such as Mg(OCH$_3$)$_2$, Mg(OC$_2$H$_5$)$_2$, Mg(OC$_2$H$_5$)(OC$_3$H$_7$), Mg(OC$_6$H$_{13}$)$_2$, Mg(OC$_6$H$_5$)$_2$, Mg(OC$_{12}$H$_{25}$)$_2$ and Mg(OC$_{20}$H$_{41}$)$_2$. Mixtures of magnesium alcoholates can be employed if desired. Preferred alcoholates are the alkoxides containing 1 to about 8 carbon atoms per alkoxy group and magnesium phenoxide, best results being attained with magnesium ethoxide.

Useful halocarboxylic acids include halogen-substituted, monocarboxylic alkanoic acids of 2 to about 8 carbon atoms such as chloroacetic, dichloroacetic, trichloroacetic, 2-bromopropionic, 3-bromopropionic, 2-bromo-2-methylpropionic, 2,3-dibromopropionic, 2,2-dichloropropionic, 2,3-dichloropropionic, 2,3,3-trichloropropionic, 3-bromo-3-methylbutyric, dichlorocrotonic, 2,3,3-trichlorobutyric and 3-bromohexanoic acids. Mixtures can be employed if desired. Preferred acids are mono-, di- and trichloroacetic acid, best results being attained with the latter.

In preparation of the support material to be employed according to this invention, the halocarboxylic acid is employed in an amount effective to form an initially soluble product on reaction with the magnesium alcoholate, though the amount should not be so high as to adversely affect polymerization activity of the ultimate catalyst component. Preferably the molar ratio of halocarboxylic acid to magnesium alcoholate ranges from about 0.8:1 to about 1.2:1. A lesser proportion of halocarboxylic acid can be used but is disadvantageous because only a portion of the mangesium alcoholate component reacts to form a soluble product, and accordingly, it is necessary to separate the soluble reaction product from unreacted magnesium alcoholate. The use of halocarboxylic acid in excess of about 1.2 moles per mole of magnesium alcoholate is not preferred because unreacted acid may interfere with subsequent preparative reactions or adversely affect polymerization performance of the ultimate catalyst component. Most preferably, the molar ratio of halocarboxylic acid to magnesium alcoholate is about 1:1.

Reaction between the halocarboxylic acid and magnesium alcoholate components is conducted in the presence of an inert liquid solvent for the halocarboxylic acid. Examples of useful solvents include alkanes such as hexane, heptane, octane and so forth; aromatics such as benzene and ethylbenzene; and hydrogenated and halogenated aromatics such as tetrahydronaphthalene, decahydronaphthalene and o-dichlorobenzene. The preferred solvent according to this invention is benzene because the halocarboxylic acid as well as its product reaction with magnesium alcoholate exhibit a relatively high solubility therein. Prior to use it is desirable to purify the solvent to be employed in order to remove traces of oxygen, water and polar compounds which may adversely affect performance of the ultimate catalyst component. Purification is conveniently accomplished by percolation of the solvent through molecular sieves and/or silica gel or by contacting the solvent with a material, such as an alkylaluminum compound, capable of scavenging impurities.

Temperature during reaction between the halocarboxylic acid and magnesium alcoholate components is sufficiently high that formation of a hydrocarbonsoluble initial reaction product occurs at reasonable rates, but not so high as to promote undesirable side reactions. Preferred temperatures range from about 20° to about 200° C. with about 50° to about 85° C. being more preferred from the standpoint of achieving desirable reaction rates without promotion of side reactions.

The time of reaction between the halocarboxylic acid and magnesium alcoholate components, while not critical with respect to catalyst performance, typically has an effect on the solubility of the reaction product in the preparative solvent. Generally, reaction times are sufficiently long to allow for formation of a soluble reaction product. Prolonged heating of the solution can result in formation of an insoluble solid. Preferred reaction times range from about ½ to about 30 hours with times in the lower portion of the range being more preferred if a soluble reaction product is desired and times in the upper portion of the range being more preferred if a solid is desired. Temperatures in the upper portion of the aforesaid range also tend to promote formation of an insoluble reaction product and thus reaction temperatures and times should be adjusted to obtain the reaction product in desired form. Reaction progress is conveniently followed by observing disappearance of the magnesium alcoholate component if a soluble reaction product is desired and reappearance of solid if an insoluble reaction product is desired.

It also is contemplated to use as the support material a product obtained by reaction of the abovedescribed halocarboxylic acid-magnesium alcoholate reaction product with at least one halogenating agent. However, this is not preferred because the resulting product typically is a hydrocarbon-insoluble solid and accordingly the advantages of a liquid-liquid preparative system are lost. If halogenating agent is to be reacted with magnesium alcoholate-halocarboxylic acid reaction product, either reducing or nonreducing halogenating agent or a combination thereof can be employed. It is to be understood that the terms "reducing" and "nonreducing" have the meanings set forth hereinabove, i.e., reducing or nonreducing with respect to the Group IVB or VB component. As in the case of the group IVB or VB component, the relative amounts of halogenating agent and magnesium alcoholate-halocarboxylic acid reaction product and reaction conditions are not critical. Preferably, however, the atomic ratio of reactive halogen in the halogenating agent to magnesium ranges from about 0.5:1 to about 5:1 and the reaction is conducted in inert liquid diluent or solvent for the magnesium alcoholate-halocarboxylic acid reaction product at about 0° to about 200° C. The product of the reaction typically is a solid which can be reacted with Group IVB or VB metal component with or without separation of excess reactants although it is preferred to remove such excess reactants.

Preparation of the invented supported catalyst components comprises reacting (A) at least one Group IVB or VB metal component selected from the group consisting of compounds of the formula $(O)_pM(OR)_nX_m$ with M, X, R, p, m and n as described hereinabove or a reaction product of such compounds with at least one nonreducing halogenating agent, with (B) at least one component prepared by reaction of at least one magnesium alcoholate with at least one halocarboxylic acid or by reaction of magnesium alcoholate-halocarboxylic acid reaction product with halogenating agent. Such components are reacted in the substantial absence of oxygen, water, carbon oxides and other extraneous catalyst poisons at temperatures ranging from about 0° to about 200° C. It often is desirable, and in some cases necessary, to further react the product of such components with at least one halogenating agent.

Group IVB or VB metal component and support material are employed in amounts such that the atomic ratio of Group IVB or VB metal to magnesium ranges from about 0.01:1 to about 100:1. Preferably, in order to ensure sufficient association of Group IVB or VB compounds with the support without the need to remove large excesses of starting materials, the Group IVB or VB metal to magnesium atomic ratio ranges from about 0.1:1 to about 10:1, best results being attained at about 0.2:1 to about 5:1.

Reaction between the Group IVB or VB metal-containing component and support material is conducted in the substantial absence of oxygen, water, carbon oxides and other materials capable of adversely affecting polymerization performance of the ultimate catalyst components. Such materials are conveniently excluded by conducting the preparation under an atmosphere of an inert gas such as nitrogen or argon.

The preparative reaction preferably is conducted in the presence of a liquid reaction medium that is substantially inert to the starting materials and liquid at the preparation temperature. Preferably, the diluent is a material in which at least one of the components used in preparation of the catalyst component is soluble. If a liquid-liquid preparation system is desired, it is most preferred to employ a reaction medium in which both components are soluble. Preferred diluents include a variety of alkanes, aromatics and hydrogenated and halogenated aromatics, specific examples of which include those materials identified hereinabove as useful solvents in preparation of magnesium alcoholate-halocarboxylic acid reaction product. Benzene is the preferred reaction medium when a soluble magnesium alcoholate-halocarboxylic acid reaction product is used as the support material. As in the case of the support material preparation, it is desirable to purify any diluent to be used in preparation of the supported catalyst component prior to use such as by percolation through molecular sieves and/or silica gel or by contacting with a material capable of scavenging impurities.

The temperature in the preparative reaction ranges from about 0° to about 200° C. Preferably, a temperature of about 20° to about 100° C. is employed in order to achieve desirable reaction rates without the need for expensive, higher boiling solvents or the use of elevated pressures to maintain lower boiling solvents in the liquid state. The time of the preparative reaction is sufficiently long to allow for adequate association of Group IVB or VB compounds to the support. Preferably, the reaction is conducted over a period of several minutes to several hours, with about ½ to about 30 hours being more preferred. It is desirable to agitate the reaction mixture during all or part of the preparation time to ensure thorough mixing and reaction of the components.

The product of the above-described preparation varies somewhat depending upon the starting materials employed. If soluble magnesium alcoholate-halocarboxylic acid reaction product and halogen-free Group IVB or VB component are used, a predominantly liquid reaction product typically is obtained. In order to obtain a solid product having acceptable catalytic activity on combination with organometallic activator, it is necessary to react this liquid product with at least one halogenating agent. Either reducing or nonreducing halogenating agents can be used, as can mixtures. Reducing halogenating agents are preferred from the standpoint of catalytic activity. The amount of halogenating agent to be employed is an amount effective to provide sufficient halogen to obtain a solid reaction product which exhibits olefin polymerization activity when combined with organometallic activator. Preferably, the amount of halogenating agent is such that the molar ratio of reactive halogen in the preparative system to the sum of (1) the product of the valence of Group IVB or VB metal in the Group IVB or VB component and the number of moles of Group IVB or VB component employed and (2) two times the number of moles of magnesium alcoholate employed in preparation of support material is at least about 0.5:1. It will be appreciated that when the Group IVB or VB metal component contains a combination of metals of different valences, (2) will be the sum of the products of the respective valences and molar amounts of the individual metals. More preferably, the aforesaid molar ratio is at least about 1:1 as catalytic activities are thereby increased. The use of large excesses of halogenating agent typically is not harmful to catalytic performance, although it may be difficult to separate the desired catalyst component from unreacted halogenating agent or reaction by-products in which case yields of polymer per weight of final catalyst component may be lower than desired. Accordingly, it is most preferred to employ halogenating agent in an amount such that the molar ratio reactive halogen to the sum of (1) and (2) as described hereinabove ranges from about 1:1 to about 10:1.

According to this aspect of the invention, reaction of the predominantly liquid reaction product of soluble support material and halogen-free Group IVB or VB component with halogenating agent is conducted in the substantial absence of water, oxygen, carbon oxides and other catalyst poisons as described hereinabove. It is preferred to conduct the reaction in an inert liquid medium such as that used in preparation of the support material or predominantly liquid reaction product. Reaction temperatures vary somewhat depending on the reactivity of the halogenating agent and preferably range from about 20° to about 100° C. in order to achieve desirable reaction rates without exposure of the ultimate catalyst component to conditions more severe than necessary. The time of reaction between the above-described, predominantly liquid reaction product and halogenating agent is sufficiently long to allow for substantial reaction of the components such that there is obtained a solid product having polymerization activity when combined with organometallic activator. Reaction progress is conveniently followed by observing precipitation of solid reaction products. Preferred reaction times range from about ½ to about 10 hours. In order to ensure thorough contacting of the predominantly liquid reaction product and halogenating agent, the components preferably are agitated during all or a substantial portion of the reaction time.

If a halogen-containing Group IVB or VB metal-containing component and/or insoluble support material is used in preparation, the reaction mixture typically contains sufficient halogen to yield a solid reaction product having acceptable polymerization activity. Accordingly, there is no need to employ additional halogenating agent in the preparation. However, even if a predominantly solid reaction product is formed, it may be desirable to employ halogenating agent in order to maximize yields of solid catalyst component and polymerization activities. Halogenating agent is employed in amounts and under conditions as described hereinabove.

Irrespective of whether a predominantly solid or liquid product is obtained on reaction of the Group IVB or VB metal-containing component with support material, if the product is to be reacted with halogenating agent, it is preferred to employ a reducing halogenating agent such as a dihydrocarbylaluminum halide or hydrocarbylaluminum dihalide or mixture thereof because catalytic activities are thereby increased. Such materials are used in amounts such that the preparative system contains sufficient halogen to yield an active catalyst component as discussed hereinabove. In addition, the amount should be such that the atomic ratio of aluminum to Group IVB or VB metal ranges from about 0.1:1 to about 20:1, and preferably about 0.5:1 to about 10:1, in order to maximize catalytic activity without undesirable reduction of Group IVB or VB metal or agglomeration of the ultimate catalyst component. Preferred reducing halogenating agents are the dialkylaluminum chlorides and alkylaluminum dichlorides containing 1 to about 8 carbon atoms per alkyl group, and mixtures thereof. Best results are attained with diethylaluminum chloride, ethylaluminum dichloride and mixtures thereof, and especially ethylaluminum dichloride. When reducing halogenating agent is employed it is preferably used as a solution in an inert solvent such as hexane to render the material nonpyrophoric and aid in conductance of heat away from the ultimate catalyst component.

As a result of the above-described preparation, there is obtained a solid catalyst component which can be combined with organometallic promoter for use in the polymerization olefins. The solid component can be employed in the form of a suspension in preparative diluent, if used, or the solid can be separated from any diluent and used as a solid or resuspended in fresh diluent. Although the precise chemical structure of the invented supported catalyst component is presently unknown, the same is believed to comprise Group IVB or VB halides bonded to or intimately associated with a support comprising magnesium, halogen and organic residues.

The catalysts of the present invention comprise the above-described solid component and an organometallic promoter. Useful organometallic promoters are well known to the art and typically include compounds of the Group IA-IVA metals having at least one organic group bonded to metal. Specific examples of useful promoters include alkyllithium compounds such as $Li(n-C_4H_9)$; organomagnesium compounds and complexes such as $Mg(C_2H_5)_2$, $Mg(C_2H_5)(C_4H_9)$ and $Mg(C_4H_9)_2 \cdot 2Al(C_2H_5)_3$; zinc alkyls such as $Zn(C_2H_5)_2$; aluminum alkyls such as $Al(C_2H_5)_3$ and $Al(i-C_4H_9)_3$; alkylaluminum halides and hydrides such as $Al(C_2H_5)_2Cl$ and $Al(C_2H_5)_2H$; gallium and indium alkyls such as $Ga(C_2H_5)_3$ and $In(C_3H_7)_3$; and silicon, tin and lead alkyls such as $Si(C_2H_5)_4$, $Sn(CH_3)_4$ and $Pb(C_2H_5)_4$. Mixtures also can be employed.

Organometallic promoters which are preferred according to this invention are the trihydrocarbylaluminums and dihydrocarbylaluminum hydrides containing 1 to about 12 carbon atoms per hydrocarbyl group. More preferably, a trialkylaluminum containing 1 to about 6 carbon atoms per alkyl radical is used. Specific examples of such promoters include triethylaluminum, triisobutylaluminum and tri-n-hexylaluminum. Triethylaluminum is most preferred.

The organometallic promoter is employed in at least an amount which is effective to activate the supported component of the invented catalyst. Preferably, the amount is such that the weight ratio of promoter to supported component is at least about 3:1. More preferably, this ratio ranges from about 5:1 to about 30:1; however, substantially greater amounts can be employed if desired and often give highly beneficial results, particularly in processes in which polymerization is conducted in the presence of a liquid polymerization medium because a portion of the promoter can be used to pretreat the polymerization medium to remove traces of oxygen, water and other catalyst poisons.

The catalysts of the invention are prepared by combining the above-described supported component and organoaluminum promoter in the substantial absence of catalyst poisons. This can be accomplished either within or outside a polymerization zone, and in the presence or absence of monomer as desired.

Prior to combining the supported catalyst component of this invention with promoter, it also is contemplated to temporarily and reversibly deactivate the component by contacting the same with a suitable deactivating agent. In this manner, the invented supported catalyst component, which may exhibit some polymerization activity even in the absence of a promoter, can be employed, without plugging of catalyst feed lines or inlet ports, in polymerization systems wherein catalyst component is conveyed to a polymerization zone in a stream containing polymerizable alpha-olefin. Once inside the polymerization zone, the temporary deactivation can be undone and activity promoted by contacting the catalyst component with promoter. Suitable deactivating agents, methods for using the same, and a method for introducing temporarily and reversibly deactivated catalyst component into a polymerization zone are disclosed in commonly assigned U.S. Pat. No. 4,130,699 (Hoff et al.) which is incorporated herein by reference. Deactivating agents which are preferred for use with the supported catalyst components of this invention are hydrogen halides and lower aliphatic alcohols, with anhydrous hydrogen chloride and ethanol being most preferred.

According to the invention, the above-described catalyst is employed in alpha-olefin polymerization processes wherein at least one polymerizable alpha-olefin is contacted with the catalyst under polymerizing conditions. Solution, bulk and gas phase processes are contemplated herein.

Alpha-olefins which can be polymerized in the presence of the invented catalysts are materials corresponding to the formula $H_2C=CHR$ wherein R is hydrogen or an alkyl radical of 1 to about 6 carbon atoms. Specific examples include ethylene, propylene, butene-1, pentene-1, 4-methylpentene-1, hexene-1 and octene-1. Mixtures of such materials with each other or other copolymerizable monomers also can be polymerized. Preferably, the invented catalysts are employed in the polymerization of ethylene or mixtures of ethylene with up to about 20 mole percent of at least one higher alpha-olefin.

The conditions under which the invented catalysts are employed in the polymerization of alpha-olefins are referred to herein as "polymerizing conditions" and include catalyst concentration, polymerization temperature and time, monomer pressure, the use of diluents in solution processes, exclusion of catalyst poisons, the use of agents to regulate polymer molecular weights and other conditions well known to persons of skill in the art. The following description of polymerizing conditions is intended to furnish guidance as to the use of the invented catalysts and is not to be construed as limiting the scope of the invention.

The amount of supported component employed in polymerization is a catalytically effective amount and varies depending on a number of factors, such as choice of polymerization technique, reactor size and configuration, and production rate. The amount can be determined by persons of skill in the art from the examples appearing hereinbelow. As noted hereinabove, promoter is used in at least an amount which is effective to promote the activity of the supported component.

Polymerization temperatures vary depending upon the type of process employed. In solution processes, wherein a solution of polyalpha-olefin in an inert polymerization medium is formed, the temperature should be sufficiently high to avoid solidification of the polymer but not so high as to vaporize the diluent employed. In the solution polymerization of ethylene, suitable temperatures range from about 120° to about 210° C. In particle form polymerization processes, wherein a suspension of solid, particulate polymer in an inert polymerization medium is formed, and in gas phase processes, wherein solid, particulate polymer is formed in the substantial absence of liquid polymerization medium, temperatures should be maintained at levels sufficiently low to avoid melting of the polymer in the polymerization zone but high enough to achieve reasonable polymerization rates. Preferred temperatures in the particle form polymerization of ethylene range from about 40° to about 110° C. In the gas phase polymerization of ethylene, temperatures preferably range from about 40° to about 130° C., and more preferably, from about 60° to about 120° C.

In solution and particle form processes, the liquid employed as polymerization medium can be an alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the polymerization temperature, or an aromatic hydrocarbon such as benzene, toluene or xylene or a halogenated aromatic compound such as chlorobenzene, chloronaphthalene or o-dichlorobenzene. The nature of the medium is subject to considerable variation, although the medium employed should be liquid under polymerization conditions and relatively inert. Other media which can be used include ethylbenzene, isopropylbenzene, ethyltoluene, n-propylbenzene, diethylbenzenes, mono- and dialkylnaphthalenes, n-octane, isooctane and methylcyclohexane. Preferably, a butane, pentane or hexane is employed.

Irrespective of the type of polymerization process employed, polymerization typically is carried out in the presence of agents which act as chain terminators and thereby allow for control of polyalpha-olefin molecular weights. Most commonly, hydrogen is employed for this purpose. The amount of hydrogen to be employed will vary depending upon the molecular weight desired and can be determined by those skilled in the art based upon the examples appearing hereinafter.

Also irrespective of polymerization technique, monomer pressures and total reactor pressures are maintained at levels sufficient to achieve reasonable polymerization rates. The latter generally range from about 100 to about 1000 psig (7 to about 70 $kg/cm^2$), and more preferably, from about 200 to about 400 psig (14 to about 30 $kg/cm^2$).

Polymerization time generally ranges from several minutes to several hours in batch processes. Contact times ranging from about 1 to about 4 hours are common when autoclave type reactors are employed. In continuous systems, wherein polymerization medium, if any, and excess monomer are recycled to a charging zone and additional catalyst and monomer introduced, contact times in the polymerization zone can be regulated as desired, and generally range from about ½ to several hours.

Polymerization in the presence of the invented catalysts is carried out in the substantial absence of oxygen, water, carbon oxides and other materials capable of adversely affecting catalyst activity. Typically, special steps need not be taken to exclude such materials from the polymerization zone due to the positive pressure exerted by the monomer or monomers to be polymerized. Purification of monomer and any diluent to be employed, such as by percolation through molecular sieves and/or silica gel or through the use of excess promoter to scavenge impurities, is helpful in excluding catalyst poisons. In polymerization processes wherein the invented supported catalyst components are contacted with a deactivating agent to facilitate addition of the component to a polymerization zone in an alpha-olefin-containing flush stream, it may be desirable to use excess promoter to scavenge the deactivator and thereby ensure the attainment of high activities.

As a result of the above-described polymerization in the presence of the invented catalysts there are obtained polyalpha-olefins, having molecular weights typically ranging from about 50,000 to about 3,000,000, in sufficiently high yields, relative to the amount of catalyst employed, that useful polymeric products are obtained without the need for separation of catalyst residues. The polymers exhibit sufficiently broad molecular weight distributions as to be processable by a variety of techniques such as extrusion, mechanical melting and casting, and are particularly well suited for molding applications.

The following examples illustrate the present invention and are not to be construed as limiting the scope thereof.

EXAMPLE I

(A) Preparation of Insoluble Support Material

To a 200 ml, 1-neck, creased flask under argon and equipped with mechanical stirrer were added 6.65 g (0.058 mole) magnesium ethylate followed by 50 ml benzene. 35 ml of a benzene solution of trichloroacetic acid containing 9.5 g (0.059 mole) of the acid then were added to the flask dropwise over 1¼ hours. On completion of the addition of the trichloroacetic acid solution, the magnesium ethylate remained unchanged in appearance. A Dean-Stark trap and a condenser were attached to the flask after which heating was begun. The contents of the flask reached the reflux temperature after 1 hour of heating. After refluxing for 1½ hours, all solid had dissolved to give a clear solution. Refluxing was continued for an additional 17 hours during which time a solid formed. Heating then was discontinued and the contents of the flask were allowed to cool under argon.

(B) Preparation of Catalyst Component

To a 200 ml, 1-neck, creased flask under argon and equipped with mechanical stirrer and a condenser attached to an argon line and bubbler were added 40 ml of the slurry prepared in (A) followed by 4.0 ml (0.036 mole) TiCl$_4$. The resulting mixture, which was orange in color, then was heated to the reflux temperature. After heating for 1 hour, the slurry was yellow in color. Heating was continued for another 23 hours after which the resulting slurry was allowed to cool under argon. The cooled slurry then was decanted, the solid was washed with hexane and then the solid was suspended in sufficient hexane to give a slurry containing 0.92 mg solid catalyst component per ml slurry.

(C) Ethylene Polymerization

A 500 ml rocking bomb was heated to 190° F. (about 87° C.) and evacuated. Subsequently, the vacuum was broken by charging argon to the bomb after which a mixture of 1.2 ml of slurry prepared in (B), containing 1.1 mg solid catalyst component, and 1 ml of a hexane solution of triethylaluminum (TEA) containing 5 mg TEA, was syringed into the bomb. The bomb then was pressured to 100 psig with ethylene followed by hydrogen to 200 psig and then ethylene to 300 psig. After about 2½ hours, the bomb was vented and opened thus terminating the polymerization. The contents of the bomb then were removed and weighed. 11.5 g solid polyethylene were recovered, corresponding to a yield of about 10,000 grams polyethylene per gram solid catalyst component and an activity of about 4,000 grams polyethylene per gram solid catalyst component per hour.

EXAMPLE II

A horizontally mounted, 1 liter autoclave reactor equipped with a paddle stirrer having the paddles attached with minimum clearance with respect to the reactor wall was evacuated, heated to 180° F. (about 82° C.) and then a mixture of 1 ml of a solution prepared by mixing 10.5 ml of a 25wt% heptane solution of TEA with 70 ml hexane, 2 ml of catalyst component slurry prepared in EXAMPLE I(B) and 4 ml hexane was charged to the autoclave with 100 psig hydrogen. Agitation at 250 rpm was begun and then the autoclave was charged with ethylene to 450 psig over a period of 10 minutes. Thereafter, ethylene was charged at 10 psig per minute for about ⅝ hour to maintain a total pressure of 450 psig in the autoclave. After a total of 1 hour, the autoclave was vented and opened and its contents removed and weighed. The yield of solid polyethylene was 27.4 g corresponding to 14,000 grams per gram solid catalyst component per hour.

EXAMPLE III

(A) Preparation of Catalyst Component

To a 200 ml, 1-neck, creased flask under argon and equipped with mechanical stirrer were added 40 ml of the slurry of support material prepared in EXAMPLE I(A). Addition of a solution of VOCl$_3$ in hexane, containing 0.438 g VOCl$_3$ per ml, was begun and on contact with the benzene from the slurry of support material, a dark, red-brown color appeared. The color disappeared with mixing of the slurry and solution until 11 ml of the solution had been added. At that point the color reappeared and remained even after stirring for several minutes. Addition of VOCl$_3$ solution was continued until a total of 17 ml (containing 7.44 g=0.0429 mole VOCl$_3$) had been added, after which the contents of the flask were heated to reflux with stirring. After heating for 23½ hours, the resulting slurry was allowed to cool under argon and then the liquid phase was decanted and the solid was washed with, and then suspended in, hexane.

(B) Ethylene Polymerization

Ethylene was polymerized in the presence of the catalyst component from (A) substantially according to the procedure of EXAMPLE I(C). A trace of polymer was recovered.

EXAMPLE IV

(A) Preparation of Soluble Support Material

To a 500 ml, 1-neck, creased flask under argon and equipped with mechanical stirrer were added 28.8 g (0.252 mole) magnesium ethylate followed 112.5 g (128 ml) reagent grade benzene and 141 ml of a benzene solution of trichloroacetic acid containing 42.2 g (0.258 mole) of the acid. The contents of the flask then were heated to reflux, with stirring, under nitrogen. The solid magnesium ethylate dissolved quickly during heating such that after refluxing for 1 hour less than about 1 g (estimated) solid remained. The result then was cooled to room temperature and allowed to sit under nitrogen overnight. Subsequently, a 250 ml sample of the liquid layer was syringed into a 500 ml Erlenmeyer flask and used in preparation of a catalyst component according to (B). To the solid and liquid remaining in the preparative flask after removal of the 250 ml sample was added excess trichloroacetic acid in an attempt to dissolve the remaining dark gray solid. Even after heating, the solid would not dissolve.

(B) Preparation of Supported Catalyst Component

To a 300 ml, 3-neck, creased flask equipped with mechanical stirrer and a condenser attached to a nitrogen line were added 18 ml of the liquid prepared in (A) (containing 0.018 mole magnesium) followed by 3.1 ml (0.0091 mole) tetrabutyl titanate (TBT). The resulting mixture was heated, with stirring, to benzene reflux for ¾ hour and then allowed to cool to room temperature. The resulting solution was clear with a slight yellow tint. 60 ml of a 25 wt% solution of ethylaluminum dichloride (EADC) in hexane then were syringed into the flask over 1/4 hour resulting in a vigorous reaction and evolution of heat and a gas. The reaction product was dark brown in color. The contents of the flask then were heated to the reflux temperature and refluxed for 17 hours after which the contents were cooled, liquid decanted and the solid washed with, and then suspended in, hexane.

EXAMPLE V

To a 300 ml, 3-neck flask under nitrogen and equipped with stirrer, a condenser and a dropping funnel were added 30 ml polymerization grade hexane followed by 5.0 ml (0.045 mole) $TiCl_4$. The resulting, clear solution was heated to reflux with stirring and 13.5 ml of the soluble support material prepared in EXAMPLE IV(A) (containing 0.013 mole magnesium) were added dropwise over ½ hour. The reaction mixture turned yellow on addition of the support material and a solid began to form immediately. The mixture was refluxed for 16¾ hours following completion of the addition of support material after which the result was allowed to cool, liquid was decanted and the solid was washed with, and then suspended in, hexane.

EXAMPLE VI

To a 300 ml, creased flask under nitrogen and equipped with mechanical stirrer were added 64 ml benzene followed by 1.2 ml (0.0094 mole) $SbCl_5$. The resulting solution was stirred at room temperature and, while stirring, 13.5 ml of the soluble support material prepared in EXAMPLE IV(A) (containing 0.013 mole magnesium) were added over 5 minutes. A yellow, hazy solution, apparently containing some very fine solid particles, resulted. The solution was heated at the reflux temperature for about 1½ hours and then, while heating, 5.0 ml (0.045 mole) $TiCl_4$ were added dropwise. A brown color resulted. Heating was continued for 16½ hours after which the resulting slurry was allowed to cool, liquid was decanted and the solid was washed with, and suspended in, hexane.

EXAMPLE VII

To a 300 ml, 3-neck, creased flask equipped with mechanical stirrer and a condenser attached to a nitrogen line were added 30 ml polymerization grade hexane followed by 5.8 ml 25 wt.% EADC in hexane (containing 0.0091 mole EADC). The solution then was heated to a slow reflux and dropwise addition of the soluble support material prepared in EXAMPLE IV(A) was begun. A total of 13.5 ml of the support material solution (containing 0.013 mole magnesium) was added over about ½ hour. Heating at the reflux temperature was continued for 2¼ hours during which a white, finely divided solid precipitated. 5.0 ml (0.045 mole) $TiCl_4$ then were added dropwise resulting in formation of a light yellow liquid phase. Heating at the reflux temperature was continued for 16¼ hours after which the resulting slurry was allowed to cool, liquid was decanted and the solid was washed with, and then suspended in, hexane.

EXAMPLE VIII

Ethylene polymerizations were conducted substantially in accordance with the procedure of EXAMPLE II using samples of the catalyst components prepared in EXAMPLES VI(B) and V-VII. Reaction conditions are reported in TABLE I.

TABLE I

| RUN NO. | CATALYST COMPONENT | AMOUNT (mg) | TEA (mg) | $H_2$ (psig) | TEMPERATURE (°C.) | DURATION (minutes) |
|---|---|---|---|---|---|---|
| 1 | IV(B) | 4.82 | 43.4 | 120 | 85 | 60 |
| 2 | IV(B) | 2.41 | 43.4 | 120 | 85 | 60 |
| 3 | V | 0.76 | 41.8 | 110 | 85 | 60 |
| 4 | V | 0.38 | 20.9 | 110 | 85 | 60 |
| 5 | VI | 1.48 | 42.9 | 100 | 85 | 60 |
| 6 | VI | 0.74 | 20.9 | 95 | 83 | 60 |
| 7 | VII | 2.00 | 22.0 | 115 | 85 | 60 |

For each of the above-described polymerizations, the weight of solid polyethylene produced (YIELD), catalyst activity (ACTIVITY) in grams solid polyethylene per gram catalyst component per hour, polyethylene melt index (MI) determined according to ASTM D-1238 Condition E and ratio ($MF_{10}/MF_1$) of melt index according to ASTM D-1238 Condition F to MI, which serves as an indication of molecular weight distribution, are reported in TABLE II.

TABLE II

| RUN NO. | CATALYST COMPONENT | YIELD (g) | ACTIVITY (g/g/hour) | MI (dg/minute) | $ME_{10}$ $MF_1$ |
|---|---|---|---|---|---|
| 1 | IV(B) | 16.1 | 3,300 | 0.95 | 33.7 |
| 2 | IV(B) | 6.7 | 2,800 | * | * |
| 3 | V | 12.1 | 15,900 | 0.50 | 32 |
| 4 | V | 5.8 | 15,300 | * | * |
| 5 | VI | 11.4 | 7,700 | 0.48[1] | * |
| 6 | VI | 6.7 | 9,200 | 0.32[1] | * |
| 7 | VII | 21.8 | 10,900 | 0.72 | 35 |

*Not determined.
[1] Products from Runs 5 and 6 were combined and MI and $MF_{10}/MF_1$ determined. MI was 0.46 dg/minute and $MF_{10}/MF_1$ was 30.2.

EXAMPLE IX

This example illustrates additional support material preparations.

(A) Soluble Support Material

To a 200 ml, 1-neck, creased flask equipped with mechanical stirrer were added 5.15 g (0.0452 mole magnesium ethylate followed by 28.8 ml reagent grade benzene and 20.6 ml of a solution of 61.9 g trichloroacetic acid in 152.0 g reagent grade benzene. The amount of trichloroacetic acid solution added contained 6.08 g (0.0372 mole) of the acid. The magnesium ethylate was unchanged in appearance after addition of the acid solution, but heating at the reflux temperature for about 1 hour resulted in dissolution of most of the solid. Another 2.0 ml of the trichloroacetic acid solution were added to the flask and heating was continued for several more minutes. Some solid remained after heating. Another 2.3 ml of the acid solution were added and heating was continued. Some of the solid dissolved but a small amount remained. Subsequently, 45 ml of liquid were removed from the flask and 4.0 ml trichloroacetic acid solution were added to the remaining solid and liquid. On heating, the solid dissolved quickly.

(B) Insoluble Support Material

To a 500 ml, 1-neck, creased flask equipped with mechanical stirrer were added 47.8 g (0.929 mole) reagent grade trichloroacetic acid followed by 91.8 g hexane. After complete dissolution of the acid, 35.5 g (0.31 mole) magnesium ethylate were added all at once. A vigorous reaction took place with the result that some of the reaction mixture boiled out of the flask. Heating of the contents of the flask resulted in formation of a sticky solid that could not be stirred.

(C) Insoluble Support Material

To a 500 ml, 3-neck, creased under nitrogen and equipped with a condenser, pressure-equalizing dropping funnel and mechanical stirrer were added 29.3 g magnesium ethylate followed by 100 ml hexane. The resulting slurry was heated to reflux and then a solution of 41.2 g trichloroacetic acid in 120 ml hexane was added dropwise. As the solution was added there resulted a sticky solid that could not be stirred. After all of the acid solution was added, the reaction mixture was refluxed for several hours and then allowed to cool. There resulted a hexane-insoluble solid.

(D) Insoluble Support Material

The liquid layer in the flask in (C) was removed and replaced with about 200 ml benzene after which the result was heated to reflux. Much of the solid dissolved during heating and the mixture could be stirred. Some solid remained after heating for 2 hours. The result was allowed to cool resulting in precipitation of a large amount of solid.

EXAMPLE X (A) Preparation of Soluble Support Material

The procedure of EXAMPLE IV(A) was repeated except that a 300 ml, 3-neck, creased flask was used, the amount of benzene initially added to the flask was 129 ml, and a solution of 42.4 g trichloroacetic acid in 143 ml benzene was used. 250 ml of the resulting solution was transferred to a nitrogen-purged Erlenmeyer flask for storage.

(B) Preparation of Supported Catalyst Component

After three to four days storage, the solution from (A) was used in preparation of a catalyst component according to the procedure of EXAMPLE IV(A) except that the solution from (A) and TBT were refluxed for 56 minutes. A portion of the resulting suspension of catalyst component was diluted with hexane to a slurry concentration of 5.36 mg/ml. Samples of the slurry, identified as (B)(1), were employed in polymerization of ethylene according to (C). About 9 days later, another portion of the catalyst component suspension was diluted with hexane to a concentration of 3.75 mg/ml. Samples of the slurry, identified as (B)(2), were employed according to (C).

(C) Ethylene Polymerization

To a 500 ml, stirred autoclave were added 230 ml hexane after which the autoclave was heated to 165°–170° F. (about 74°–77° C.). The autoclave then was charged to 50 psig with ethylene after which an amount of a solution of TEA in hexane (40 mg TEA per ml solution) was flushed into the autoclave with 100 psig ethylene. Subsequently, hydrogen was pressured to the autoclave and then an amount of catalyst component sample was washed into the autoclave with 30 ml hexane. The autoclave then was charged with ethylene to 300 psig. After 1 hour, the autoclave was vented and opened, and its contents removed, weighed and MI determined. For each run, the amount of catalyst component, weight ratio of TEA to catalyst component (TEA/CAT), hydrogen partial pressure and polymerization results are reported in TABLE III.

TABLE III

| RUN NO. | CATALYST COMPONENT | AMOUNT (mg) | TEA CAT | $H_2$ (psig) | YIELD (g) | ACTIVITY (g/g/hr) | MI (dg/min.) |
| --- | --- | --- | --- | --- | --- | --- | --- |
| 1 | (B) (1) | 2.68 | 9:1 | 100 | 56.3 | 21,000 | 2.5 |
| 2 | (B) (1) | 2.68 | 9:1 | 75 | 57.1 | 21,300 | 0.93 |
| 3 | (B) (1) | 1.69 | 19:1 | 75 | 61.1 | 36,200 | 0.5 |
| 4 | (B) (1) | 1.69 | 19:1 | 75 | 54.6 | 32,300 | 0.68 |
| 5 | (B) (2) | 2.25 | 9:1 | 100 | 61.4 | 27,300 | 1.4 |
| 6 | (B) (2) | 2.25 | 19:1 | 100 | 59.2 | 26,300 | 1.6 |
| 7 | (B) (2) | 1.88 | 19:1 | 90 | 64.2 | 34,000 | 0.74 |
| 8* | (B) (2) | 1.88 | 9:1 | 90 | 24.4 | 31,000 | 0.57 |

*Polymerization terminated 25 minutes into the run for unknown reasons.

We claim:

1. An olefin polymerization catalyst component comprising the reaction product of components comprising
   (A) at least one Group IVB or VB metal-containing component selected from the group consisting of
      (1) compounds corresponding to the formula $(O)_p M(OR)_n X_m$ wherein M is a higher valent Group IVB or VB metal, R is hydrocarbyl, X is halogen, p is 0 or 1 and m and n are numbers equal to or greater than 0 such that m+n+2p equals the valance of M; and
      (2) compounds prepared by reaction of (1) with at least one nonreducing halogenating agent; and
   (B) at least one support material selected from the group consisting of
      (1) a reaction product of at least one magnesium alcoholate with at least one halocarboxylic acid, said acid being used in an amount effective to form an initially soluble reaction product with said alcoholate, said reaction being conducted in an inert solvent for the halocarboxylic acid and in the substantial absence of water, oxygen, carbon oxides and other extraneous catalyst poisons; and (2) a reaction product of (1) with at least one halogenating agent;

said components (A) and (B) being reacted at about 0° to about 200° C. in the substantial absence of oxygen, water, carbon oxides and other extraneous catalyst poisons in amounts such that the atomic ratio of Group IVB or VB metal in (A) to magnesium in (B) ranges from about 0.01:1 to about 100:1; provided that when the amount of reactive halogen in (A) and (B) is less than an amount effective to give an active catalyst component, said reaction product of (A) and (B) is reacted in the substantial absence of water, oxygen, carbon oxides and other extraneous catalyst poisons with at least one halogenating agent (C) in an amount such that (A), (B) and (C) contain at least an effective amount of halogen.

2. The catalyst component of claim 1 wherein (A) is at least one compound of the formula $(O)_pM(OR)_nX_m$ wherein M is titanium(IV), zirconium(IV), or vanadium(III), (IV), or (V), R contains 1 to about 12 carbon atoms and X is chlorine or bromine.

3. The catalyst component of claim 2 wherein (B) is at least one hydrocarbon-soluble reaction product of said magnesium alcoholate and said halocarboxylic acid.

4. The catalyst component of claim 3 wherein said hydrocarbon-soluble reaction product is prepared by reaction of at least one magnesium alcoholate containing 1 to about 12 carbon atoms per alcoholate group with at least one monocarboxylic, haloalkanoic acid of 2 to about 8 carbon atoms in benzene in amounts such that the molar ratio of halocarboxylic acid to magnesium alcoholate ranges from about 0.8:1 to about 1.2:1.

5. The catalyst component of claim 4 wherein (A) is a titanium compound selected from the group consisting of titanium tetrachloride and titanium alkoxides and alkoxychlorides containing 1 to about 6 carbon atoms per alkoxy group, or a combination of said titanium compound with at least one chloride, oxychloride, alkoxide, oxyalkoxide, alkoxychloride or oxyalkoxychloride of zirconium or vanadium containing 1 to about 6 carbon atoms per alkoxy group and (C) is a dialkylaluminum chloride or alkylaluminum dichloride containing 1 to about 8 carbon atoms per alkyl group or a mixture thereof.

6. An alpha-olefin polymerization catalyst comprising the catalyst component of claim 1 and at least one organometallic promoter in an amount effective to activate said catalyst component.

7. An alpha-olefin polymerization catalyst comprising the catalyst component of claim 3 and a trihydrocarbylaluminum or dihydrocarbylaluminum hydride containing 1 to about 12 carbon atoms per hydrocarbyl group in an amount effective to activate said catalyst component.

8. An alpha-olefin polymerization catalyst comprising the catalyst component of claim 5 and triethylaluminum in an amount effective to activate said catalyst component.

9. An alpha-olefin polymerization catalyst comprising (A) a solid reaction product of (1) titanium tetrachloride or a titanium(IV) alkoxychloride containing 1 to about 6 carbon atoms per alkoxy group with (2) a benzene-soluble product prepared by reaction of magnesium ethoxide with trichloroacetic acid in a molar ratio of about 1:1 at about 50° to about 85° C. in benzene in the substantial absence of water, oxygen, carbon oxides and other extraneous catalyst poisons; said components (1) and (2) being reacted at about 0° to about 200° C. in an inert solvent for (2) in the substantial absence of water, oxygen, carbon dioxides and other extraneous catalyst poisons in amounts such that the atomic ratio of titanium in (1) to magnesium in (2) ranges from about 0.2:1 to about 5:1; and (B) triethylaluminum in an amount effective to activate (A).

10. An alpha-olefin polymerization catalyst comprising (A) a solid product prepared by reaction of (1) titanium tetrachloride or a titanium(IV) alkoxide or alkoxychloride containing 1 to about 6 carbon atoms per alkoxy group with (2) a benzene-soluble product prepared by reaction of magnesium ethoxide with trichloroacetic acid in a molar ratio of about 1:1 at about 50° to about 85° C. in benzene in the substantial absence of water, oxygen, carbon oxides and other extraneous catalyst poisons; said components (1) and (2) being reacted at about 0° to about 200° C. in an inert solvent for (2) in the substantial absence of water, oxygen, carbon oxides and other extraneous catalyst poisons in amounts such that the atomic ratio of titanium in (1) to magnesium in (2) ranges from about 0.2:1 to about 5:1, followed by reaction of the product of (1) and (2) with (3) ethylaluminum dichloride, diethylaluminum chloride or a mixture thereof of about 20° to about 100° C. in the substantial absence of water, oxygen, carbon oxides and other extraneous catalyst poisons in amounts such that the atomic ratio of aluminum in (3) to titanium in (1) ranges from about 0.1:1 to about 20:1 and such that the preparative system contains sufficient reactive halogen to yield an active catalyst component; and (B) triethylaluminum in an amount effective to activate (A).

* * * * *

UNITED STATES PATENT OFFICE
CERTIFICATE OF CORRECTION

Page 1 of 2

Patent No. 4,311,612  Dated January 19, 1982

Inventor(s) DAVID E. BOONE and JAMES L. JEZL

It is certified that error appears in the above-identified patent and that said Letters Patent are hereby corrected as shown below:

Patent

| Column | Line | Correction |
|---|---|---|
| 1 | 38 | "catalysts" should read --catalyst-- |
| 2 | 61 | "mangesium" should read --magnesium-- |
| 3 | 18 | "support catalyst" should read --supported catalyst-- |
| 3 | 39 | "Group IVB and VB" should read --Group IVB or VB-- |
| 3 | 56 | "leaset" should read --least-- |
| 4 | 22 | "$POCl_3, SOCl_2$" should read --$POCl_3, PCl_3, SOCl_2$-- |
| 4 | 47 | "or 30 5" should read --or + 5-- |
| 4 | 53 | "$ZrCL_4$" should read --$ZrCl_4$-- |
| 5 | 40-41 | "reaction support" should read --reaction of support-- |
| 6 | 5 | "mangesium" should read --magnesium-- |
| 6 | 38-39 | "hydrocarbonsolu-ble" should read --hydrocarbon-soluble-- |
| 6 | 67 | "abovedescribed" should read --above-described-- |
| 7 | 12 | "group" should read --Group-- |
| 12 | 19 | "o-dichlorobenzene" should read --o-dichlorobenzene-- |
| 14 | 22 | "14,000" should read --14,400-- |

UNITED STATES PATENT OFFICE
CERTIFICATE OF CORRECTION

Patent No. 4,311,612   Dated January 19, 1982

Inventor(s) DAVID E. BOONE and JAMES L. JEZL

It is certified that error appears in the above-identified patent and that said Letters Patent are hereby corrected as shown below:

| Patent Column | Line | |
|---|---|---|
| 14 | 58 | "followed 112.5 g" should read --followed by 112.5g-- |
| 16 | 43 | "$\frac{ME_{10}}{MF_1}$" (Table II column heading) should read --$\frac{MF_{10}}{MF_1}$ -- |
| 17 | 24 | "creased under" should read --creased flask under-- |
| 17 | 67 | "was" should read --were-- |
| 18 | 52 | "$(O)_{p-}$" should read --$(O)_p$ -- |
| 20 | 20 | "carbon dioxides" should read --carbon oxides-- |

Signed and Sealed this

Fourth Day of January 1983

[SEAL]

Attest:

GERALD J. MOSSINGHOFF

Attesting Officer   Commissioner of Patents and Trademarks